(12) United States Patent
Hu et al.

(10) Patent No.: US 11,115,291 B2
(45) Date of Patent: Sep. 7, 2021

(54) CONFIGURING AN APPLIANCE USING INTENT-BASED INFORMATION OF A NETWORK

(71) Applicant: Cisco Technology, Inc., San Jose, CA (US)

(72) Inventors: Yongmei Hu, Los Altos, CA (US); Mark Montañez, Gilroy, CA (US); Amit Dutta, Fremont, CA (US); Lisa Brown, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 57 days.

(21) Appl. No.: 16/215,279

(22) Filed: Dec. 10, 2018

(65) Prior Publication Data
US 2020/0186436 A1 Jun. 11, 2020

(51) Int. Cl.
*H04L 12/24* (2006.01)
*H04L 12/46* (2006.01)

(52) U.S. Cl.
CPC .......... *H04L 41/22* (2013.01); *H04L 12/4641* (2013.01); *H04L 41/0806* (2013.01)

(58) Field of Classification Search
CPC .. H04L 41/22; H04L 12/4641; H04L 41/0806
See application file for complete search history.

(56) References Cited

U.S. PATENT DOCUMENTS

| | | | | |
|---|---|---|---|---|
| 6,772,204 B1* | 8/2004 | Hansen | ............... | H04L 41/0883 709/220 |
| 7,225,244 B2* | 5/2007 | Reynolds | ................. | G06F 1/14 709/203 |
| 8,145,789 B1* | 3/2012 | Stamler | ............... | H04L 41/0672 709/244 |
| 9,130,835 B1* | 9/2015 | White | ................. | H04L 41/0806 |
| 2007/0111568 A1* | 5/2007 | Ferrari | ............... | H04L 41/0233 439/131 |
| 2008/0267090 A1* | 10/2008 | Okita | ..................... | H04L 12/66 370/254 |
| 2009/0207756 A1* | 8/2009 | Sakai | ................. | H04L 41/0873 370/254 |

(Continued)

*Primary Examiner* — John A Follansbee
*Assistant Examiner* — Raqiul A Choudhury
(74) *Attorney, Agent, or Firm* — Merchant & Gould P.C.

(57) ABSTRACT

A method is disclosed for transmitting configuration data to an internetworking device to cause configuration of a network port on the internetworking device. The method comprises generating and causing display, on a computer display device, of a graphical user interface comprising a graphical representation of network ports on the internetworking device and a text area prompting input of current network environment information. Receiving input specifying the network environment. Automatically deriving network configuration values to configure the network port on the internetworking device, the network configuration values being based on the input. Displaying a graphical representation of the network port and the network configuration values corresponding to the network port. In response to input confirming the network configuration values for the network port, transmitting configuration data to the internetworking device to cause configuring of the network port using the network configuration values.

20 Claims, 9 Drawing Sheets

(56) References Cited

U.S. PATENT DOCUMENTS

| | | | |
|---|---|---|---|
| 2009/0296572 A1* | 12/2009 | Xiong | H04L 45/00 370/228 |
| 2012/0067945 A1* | 3/2012 | Zsigmond | H04L 67/34 235/375 |
| 2016/0001184 A1* | 1/2016 | Sepulveda | A63F 13/803 463/31 |
| 2016/0103692 A1* | 4/2016 | Guntaka | G06F 8/35 713/2 |
| 2017/0099347 A1* | 4/2017 | Pucha | G06F 16/178 |
| 2018/0219739 A1* | 8/2018 | Berry | H04L 41/0846 |
| 2019/0356551 A1* | 11/2019 | Lekshmanan | H04L 43/045 |

\* cited by examiner

CONFIGURING AN APPLIANCE USING INTENT-BASED INFORMATION OF A NETWORK

TECHNICAL FIELD

One technical field of the present disclosure is computer-implemented network management, including management of internetworking devices in local area networks (LANs), wide area networks (WANs) and other kinds of networks, network appliance setup, and configuring network appliances.

BACKGROUND

The approaches described in this section could be pursued but are not necessarily approaches that have been previously conceived or pursued. Therefore, unless otherwise indicated herein, the approaches described in this section are not prior art to the claims in this application and are not admitted as prior art by inclusion in this section.

Configuring a new computing device, such as an internetworking device, and connecting the device to an existing network typically involves configuring each connected port on the device. Product setup tools assist in configuring such devices by generating prompt data requesting to input specific configuration information describing how each port is to be connected to an existing network. Product setup tools may be implemented as a series of prompts require input of the configuration values to configure each of the ports on the device. For example, the product set tool may require input of an IP address, netmask, default gateway IP address, DNS server information, and static routes for each network port to be configured. However, these types of setup tools often require explicit knowledge of each configuration value needed to set up each of the ports on the device. If configuration values needed to set up the device are wrong or missing, the device may not be set up correctly and may not operate correctly. Additionally, conventional product setup tools may not transmit an alert when incorrect configuration information is provided, requiring troubleshooting of several configuration values to determine which value was incorrectly entered. To successfully configure a device, all the correct configuration values must be available, prior to executing the product setup tool. These approaches result in generating and transmitting excess prompt data and receiving excess input data, wasting CPU resources and network bandwidth.

Another challenge of configuring multiple ports on a device is causing the product setup tool to reference a correct port. For example, the product setup tool may refer to different ports using a generated reference number, a MAC address, or a combination. These inconsistent displays involve generating and displaying needless data. Users who are not familiar with the device may not know which port a reference number refers to by the setup tool. As a result, the user may erroneously connect the wrong wires to the wrong port or provide incorrect configuration information for the specified interface. Thus, more efficient product setup tools that assist clearly identify interfaces on devices using reduced, consistent datasets are desired.

SUMMARY

The appended claims may serve as a summary of the invention.

DESCRIPTION OF EXAMPLE EMBODIMENTS

Figure 1:
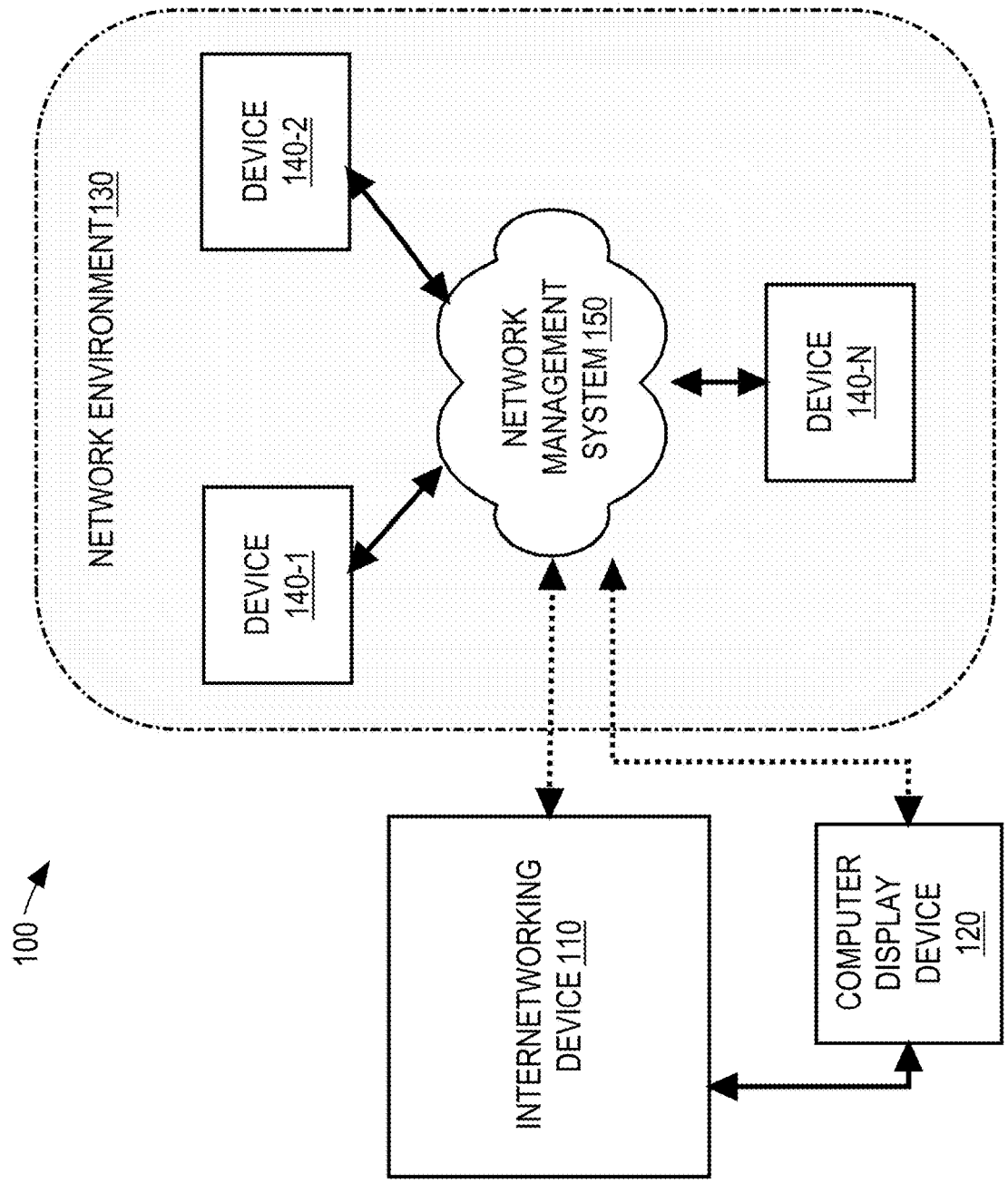
FIG. 1 depicts a diagram of a networked environment in which techniques described herein may be implemented, according to various embodiments.

Configuring an appliance using intent-based information of a network topology is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 GENERAL OVERVIEW
2.0 STRUCTURAL OVERVIEW
3.0 PROCEDURAL OVERVIEW
   3.1 INTENT-BASED INFORMATION GATHERING
   3.2 DERIVING SET OF NETWORK CONFIGURATION VALUES
   3.3 CONFIGURING AN INTERNETWORKING DEVICE
4.0 IMPLEMENTATION MECHANISMS-HARDWARE OVERVIEW
5.0 EXTENSIONS AND ALTERNATIVES
1.0 Overview Configuring an appliance using intent-based information of a network topology is described in a disclosure that is directed to improvements in internetworking technology by providing new methods of configuring routers, switches and other internetworking gear. In an embodiment, a method for configuring an internetworking device using input that specifies network environment information is provided. A graphical user interface may be generated and displayed on a computer display device. The graphical user interface may include a graphical representation of network ports on the internetworking device to be configured. The graphical user interface may include a text area prompting a user to input current network environment information corresponding to the network environment in which the internetworking device is to be installed. User input may be received that specifies the network environment information for the network. A set of network configuration values may be derived from the received network environment information. The set of network configuration values may be used to configure a network port on the internetworking device.

The computer display device may then display, within the graphical user interface, a graphical representation of the network port and the set of network configuration values corresponding to the network port on the internetworking device. In response to input confirming the set of network configuration information for the network port, configuration data may be transmitted to the internetworking device to cause configuration of the network port of the internetworking device.

In an embodiment, the text area within the displayed graphical user interface may prompt the user with an option to specify whether the current network environment has a dedicated management network. User input may be received specifying configuration information for the current network environment that indicates that the current network may be configured to enable a port for the dedicated management network. The graphical user interface may be displayed, on the display computer device, with the text area prompting the user to input additional information including a dynamic name server, a default gateway IP address, a subnet mask, and a virtual local area network identifier for the dedicated management network. A second input may be received, which specifies at least one of the dynamic name server, the default gateway IP address, the subnet mask, and the virtual local area network identifier for the dedicated management network. The set of network configuration values may be derived to configure the network port on the internetworking device for an enterprise network connection and a second network port on the internetworking device for the dedicated management network. The set of network configuration values may be based, at least in part, on the dynamic name server, the default gateway IP address, the subnet mask, and the virtual local area network identifier for the dedicated management network.

In an embodiment, the text area within the displayed graphical user interface may prompt the user with an option to specify whether the current network environment has dedicated internet access. User input may be received that specifies configuration information for the current network environment that indicates that the current network environment is enabled for providing an interface for dedicated internet access. The graphical user interface may be displayed, on the display computer device, with the text area prompting the user to input proxy server information for the dedicated internet access. A second input may be received, which specifies the proxy server information for the dedicated internet access. The set of network configuration values may be derived to configure the network port on the internetworking device for an enterprise network connection and a second network port on the internetworking device for the dedicated internet access. The set of network configuration values based, at least in part, on the proxy server information for the dedicated internet access.

In an embodiment, the text area within the displayed graphical user interface may prompt the user with an option to specify whether the internetworking device is part of a cluster of multiple internetworking devices. User input may be received specifying that the internetworking device is to be set up as part of the cluster of multiple internetworking devices. The graphical user interface may be displayed, on the display computer device, with the text area prompting the user to input credentials for the cluster of multiple internetworking devices. A second input may be received, which specifies the credentials for the cluster of multiple internetworking devices. The set of network configuration values may be derived to configure the network port on the internetworking device for an enterprise network connection and a second network port on the internetworking device for connecting to the cluster of multiple internetworking devices. The set of network configuration values based, at least in part, on the input credentials.

In an embodiment, deriving the set of network configuration values to configure the network port on the internetworking device for an enterprise network connection and a second network port on the internetworking device for connecting to the cluster of multiple internetworking devices may comprise: retrieving a second set of network configuration values associated with a second internetworking device of the cluster of multiple internetworking devices using the credentials for the cluster of multiple internetworking devices, and deriving the set of network configuration values to configure the network port and the second network port on the internetworking device using the second set of network configuration values.

In an embodiment, deriving the set of network configuration values to configure the network port on the internetworking device may comprise determining requirements for physical link characteristics, such as speed, duplex, etc., from the user input specifying the current network environment information. The network port may be selected from a plurality of network ports on the internetworking device that satisfy the bandwidth requirements. The set of network configuration values may be derived to configure the network port, the set of network configuration values being based on the user input specifying the current network environment information.

In an embodiment, the method may further comprise: validating whether connection of the network port of the internetworking device to the current network environment is successful by testing connectivity between the internetworking device and the current network environment via the network port, determining that the connection of the network port of the internetworking device to the current network environment is unsuccessful, and displaying in the graphical user interface an alert indicating an unsuccessful connection between the network port of the internetworking device to the current network environment and installation instructions describing how to physically connect the internetworking device using the network port to the current network environment.

In an embodiment, the derived set of network configuration values may be stored, within the internetworking device, as a data object that is associated with the network port on the internetworking device. Upon displaying the graphical representation of the network port and the set of network configuration values corresponding to the network port, a second user input may be received specifying reconfiguration of the set of network configuration values associated with the network port to a second network port on the internetworking device. The set of network configuration values may be disassociated from the network port and associating the set of network configuration values to the second network port on the internetworking device. A graphical representation may be displayed, within the graphical user interface, representing the second network port and the set of network configuration values corresponding to the second network port on the internetworking device.

In an embodiment, the method may further comprise: the internetworking device, deriving a second set of network configuration values to configure a second network port on the internetworking device, wherein the second set of network configuration values are based on the user input specifying the current network environment information, the internetworking device, displaying, within the graphical user interface, a graphical representation of the second network port and the second set of network configuration values corresponding to the second network port on the internetworking device, and the internetworking device, upon receiving user input confirming the second set of network configuration values for the network port, configuring the second network port of the internetworking device using the second set of network configuration values.

In other embodiments, the invention encompasses a computer apparatus and a computer-readable medium configured to carry out the foregoing steps. It will be apparent from the disclosure as a whole that the purpose and character of the disclosure is directed to technical improvements in the field of internetworking, particularly programmatic methods of communicating with internetworking devices to configure the devices for better operation in networks.

2.0 Structural Overview

FIG. 1 depicts a diagram of a networked environment, in an example embodiment.

In an embodiment, the system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

In an embodiment, system 100 may include an internetworking device 110, a computer display device 120, and a network environment 130. Network environment 130 may represent a network of one or more computers, such as an enterprise network. Network environment 130 may include devices 140-1, 140-2, and 140-N and network management system 150. Devices 140-1, 140-2, and 140-N may represent a plurality of computers that are configured to provide the functions and operations related to network communication within the network environment 130. FIG. 1 depicts only one of many possible arrangements of components configured to execute the programming described herein. Other arrangements may include additional, fewer, or different components than currently depicted in FIG. 1.

In an embodiment, network management system 150 may represent a central entity such as a server computer system and may be implemented using a server-class computer or other computers having one or more processor cores, co-processors, or other computers. The network management system 150 may be a physical server computer and/or a virtual server instance stored in a data center, such as through cloud computing. The network management system 150 may implement one or more computer programs configured to provide network management of devices within network environment 130. Network management may include, but is not limited to, functions for performance monitoring, notification handling, configuration of data paths, configuration of new and/or existing devices, and any other activities related to the network environment 130.

In an embodiment, the computer display device 120 may represent a computer communicatively coupled to the network management system 150 for the purpose of providing an interactive graphical user interface (GUI) to users to operate computer programs implemented by the network management system 150. For example, the computer display device 120 may be a laptop, tablet, or other computer that may be used to log into the computer programs implemented by the network management system 150.

In an embodiment, internetworking device 110 may represent a new computing device to be added to the network environment 130. For example, internetworking device 110 may represent a router, switch, server, or any other computing device that may be added to the network management system 150. The internetworking device 110 may include preloaded software components configured to communicate with the network management system 150 for the purpose of configuring internetworking device 110 to operate within the network environment 130. For example, the internetworking device 110 may include preloaded software that when connected to the network environment 130 may receive network configuration values from the network management system 150 that may be used to configure one or more network ports on the internetworking device 110 for operation within the network environment 130.

In an embodiment, internetworking device 110 may also include one or more standalone software components of the network management system 150 implemented to configure the one or more ports of the internetworking device 110 prior to being physically connected to the network environment. These one or more standalone software components provide users with the ability to pre-configure the internetworking device 110 prior to connecting the internetworking device 110 to the network management system 150. This may be advantageous when connecting the internetworking device 110 to a production/live network environment, where preventing errors and/or downtimes due to configuration issues are to be avoided.

3.0 Procedural Overview

Figure 2:
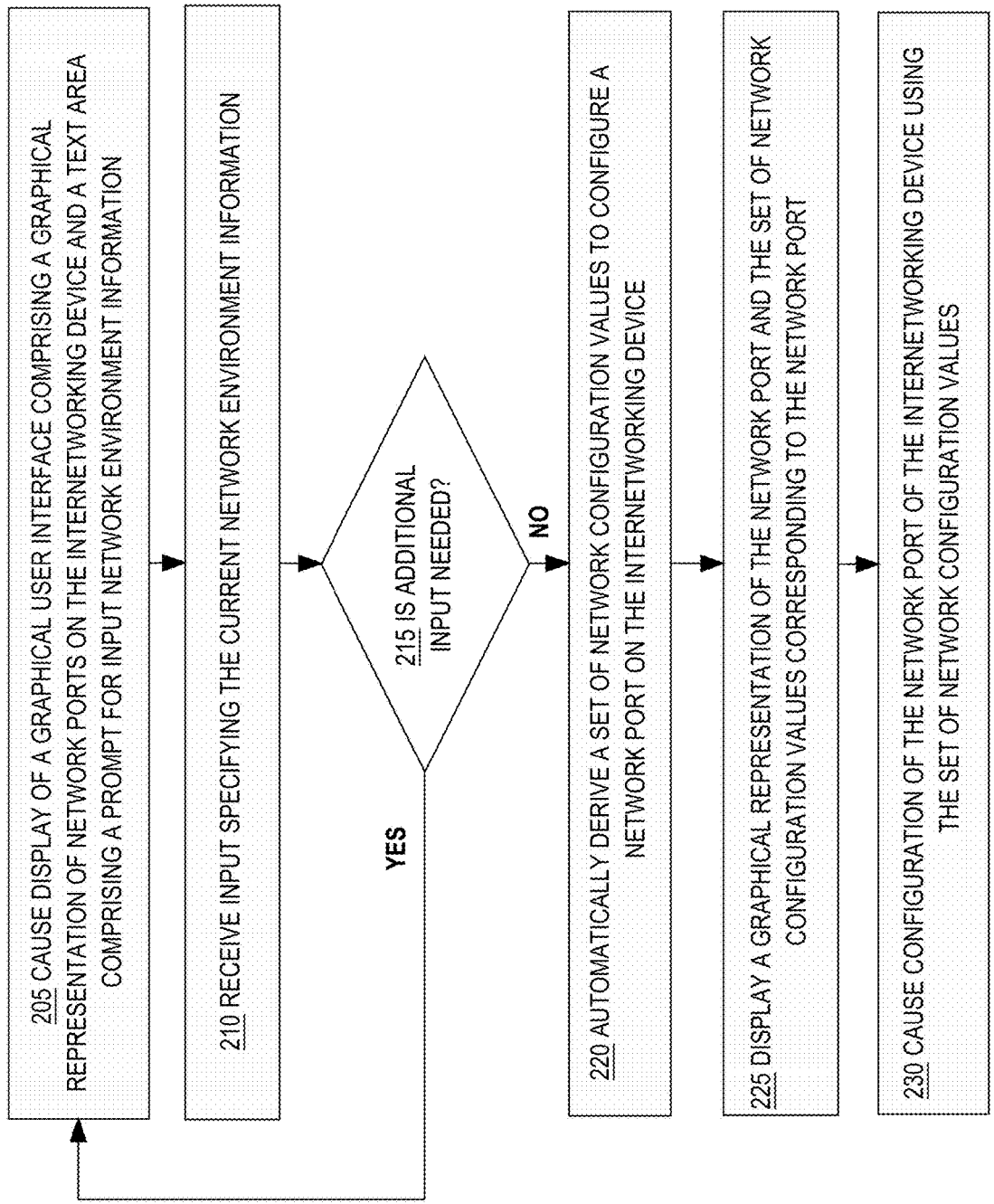
FIG. 2 depicts a method or algorithm for configuring an internetworking device using a graphical user interface to receive input specifying intended use of the internetworking device, according to various embodiments.

FIG. 2 depicts a method or algorithm for configuring an internetworking device using a graphical user interface to receive input specifying intended use of the internetworking device. FIG. 2 is described at the same level of detail that is ordinarily used, by persons of skill in the art to which this disclosure pertains, to communicate among themselves about algorithms, plans, or specifications for other programs in the same technical field. While process 200 shows a plurality of steps for causing display of a graphical user interface, receiving user input, deriving a set of network configuration values, and configuring network ports on the internetworking device, the algorithm or method described herein may be performed using any combination of one or more steps of FIG. 2 in any order, unless otherwise specified. In an embodiment, one or more computer programs of the network management system 150 may perform the steps of process 200 depicted in FIG. 2. In other embodiments, the one or more standalone software components implemented on the internetworking device 110 may perform the steps of process 200.

3.1 Intent-Based Information Gathering

For the purposes of clarity, the steps depicted in FIG. 2 are performed by the network management system 150. At step 205, process 200 causes display of a GUI comprising a graphical representation of network ports on the internetworking device and a text area prompting a user to input network environment information. In an embodiment, the network management system 150 may cause the display of the GUI onto the computer display device 120. For example, a user may connect to the network management system 150 using the computer display device 120. Upon connecting to the network management system 150, the network management system 150 may send data corresponding to the GUI to the computer display device 120 for display on a display screen of the computer display device 120.

The GUI may be a representation of a configuration tool for configuring network settings of the internetworking device 110 that is to be connected to the network environment 130. In an embodiment, the graphical user interface may include a graphical representation of the network ports on the internetworking device 110. The graphical representation of network ports on the internetworking device 110 may be used as an installation aid to the user by highlighting the location of each network port being configured during the configuration process.

In an embodiment, the text area may contain one or more questions and/or options for the user regarding the network environment. For example, questions may include, but are not limited to, asking whether the internetworking device 110 has a dedicated management network, dedicated internet access, network information about an enterprise network connection, and whether the internetworking device 110 is part of a cluster of devices.

Figure 3A:
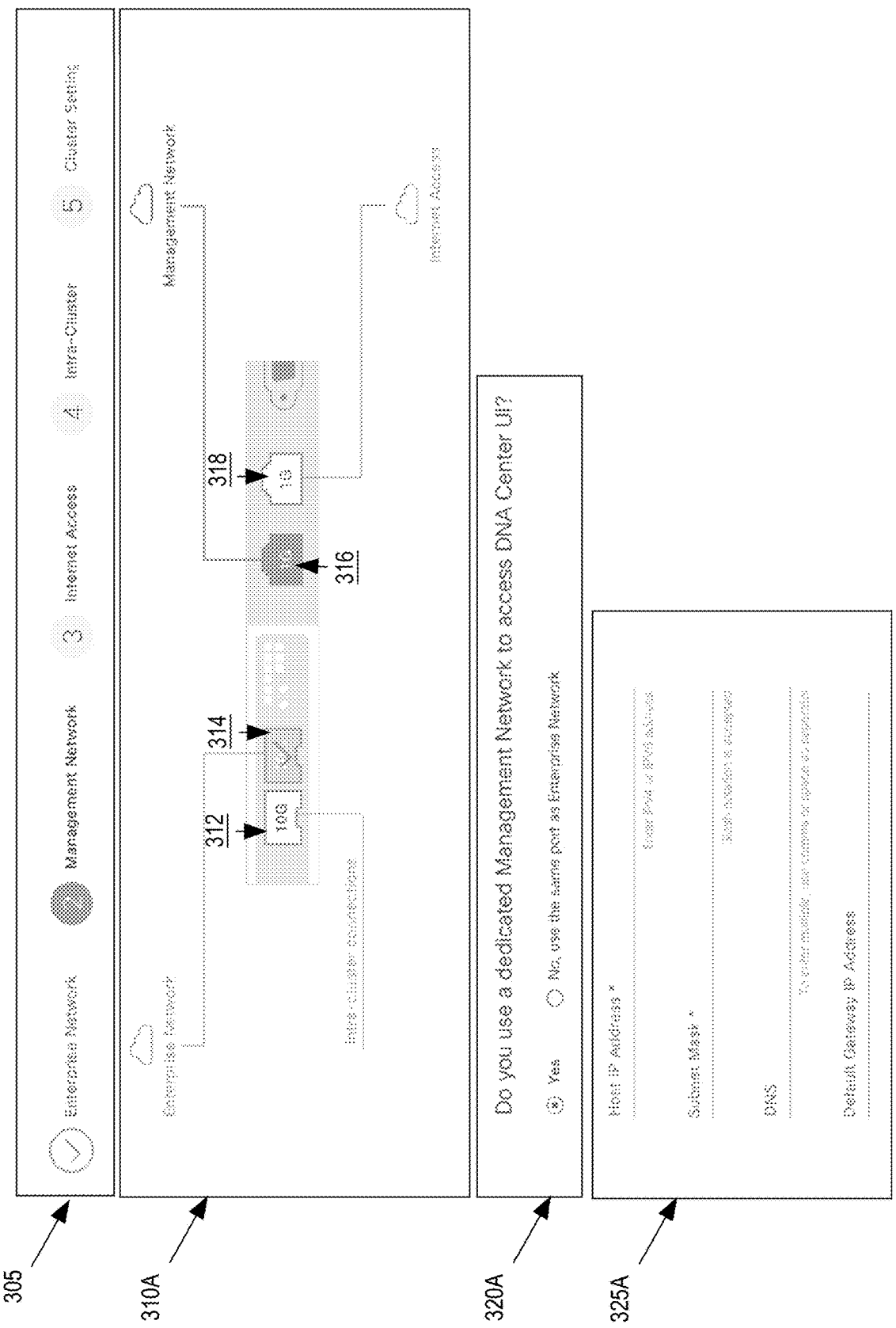
FIG. 3A depicts an example illustration of the graphical user interface provided by a network management system and displayed on a display computer device, according to various embodiments.

FIG. 3A depicts an example illustration of the graphical user interface provided by the network management system and displayed on a computer display device 120. The graphical user interface may include a configuration status pane, a graphical representation of network ports of the internetworking device 110, and a text area instructing the user for configuration input related to the network environment 130. In an embodiment, area 305 may include a configuration status pane that indicates to the user the current step of the process being configured. For example, area 305 indicates that information related to the management network is currently being gathered. Gathering information related to the management network may include prompting the user to answer questions related to the management network, such as whether the network uses a dedicated management network.

In an embodiment, graphical representation 310A represents a graphical display of network ports on the internetworking device 110, including network ports 312-318. Each of the network ports 312-318 may be annotated with description of the type of connection each port represents. For example, network port 312 may be labelled as "Enterprise Network" instructing the user that network port 312 is designated to receive a network cable that connects the internetworking device 110 to the enterprise network. In an embodiment, labels for each network port 312-318 may change depending on provided user input describing the current configuration of the network environment 130.

In an embodiment, text area 320A may contain one or more questions, forms, text boxes, radio buttons, or any other graphical user interface elements for displaying questions and receiving input from the user. For example, text area 320A displays text "Do you use a dedicated Management Network?" and a set of radio buttons allowing the user to choose either "yes" or "no". Upon receiving a user selection of one of the two radio buttons, the network management system 150 may prompt the user for additional network information or may derive a set of configuration values for configuring the internetworking device 110. For instance, if the user selected the yes radio button indicating that the network uses a dedicated management network, then the network management system 150 may update the display by presenting the user with text area 325A that displays questions and a series of fillable text boxes to input network information related to the dedicated management network, such as a dynamic name server (DNS), a default Gateway IP address, a subnet mask, and a virtual local area network identifier (VLAN ID).

In other examples not shown in FIG. 3A, the network management system 150 may cause display of the graphical user interface with text area 320A prompting the user to indicate whether the network uses a dedicated internet access, network information about an enterprise network connection, and whether the internetworking device 110 is part of a cluster of devices. In an embodiment, at step 205 the network management system 150 may cause display of the graphical user interface prompting the user to input information about the existing enterprise network connection. The text area 320A may prompt the user to enter information for the current enterprise network connection and text area 325A may include text boxes for entering a host IP address, a subnet mask, DNS, and a default gateway IP address.

In another embodiment, at step 205 the network management system 150 may cause display of the graphical user interface prompting the user to input whether the network includes dedicated internet access or whether the network provides network access via one of the other enabled interfaces. Dedicated internet access may refer configuration of a dedicated proxy server for internet access. For example, the network management system 150 may display in text box 320A a question asking the user whether the network uses dedicated internet access and radio buttons allowing the user to choose either "yes" a dedicated internet access is available or "no" internet access uses the same port as the enterprise network. If the user indicates that the network supports dedicated internet access, then the network management system 150 may display within text area 325A prompts to the user to input proxy server information related to the dedicated internet access option previously selected. For example, the text area 325A may prompt the user to input proxy server information including, but not limited to, whether the proxy server is HTTPS or Websocks, an IP address for the proxy server, a port for the proxy server, and access credentials including username and password.

In yet another embodiment, at step 205 the network management system 150 may cause display of the graphical user interface prompting the user to input whether the internetworking device 110 is part of a cluster internetworking devices. For example, internetworking device 110 may be one of multiple internetworking devices configured as part of a cluster. The internetworking device 110 may be configured as the master device within the cluster or as slave device depending on the intended configuration. The text area 320A of may display a prompt for the user to specify whether a dedicated port is to be used for connecting the internetworking device 110 to a cluster of other devices. If the user indicates that the internetworking device is part of a cluster, then the network management system 150 may display additional prompts within text area 325A. Text area 325A may prompt the user to specify whether the internetworking device 110 is to be configured as a new cluster or is joining an existing cluster. If the internetworking device 110 is to join an existing cluster then the network management system 150 may cause display of prompts asking the user to specify the IP address of the master device and the login credentials for the master device. If the internetworking device 110 is to be configured as a master device for a new cluster, then the network management system 150 may cause display of prompts asking the user to specify an IP address and subnet for a new cluster.

Referring to FIG. 2, at step 210 process 200 receives user input specifying current network environment information. In an embodiment, the network management system 150 may receive, via user input from the computer display device 120, input specifying current network environment information. The input of network environment information may be in response to a question presented to the user in text area 320A. For instance, text area 320A may contain the question "Do you use a dedicated management network?" and radio buttons corresponding to either yes or no. The user may select the radio button corresponding to "yes" within the text area 320A, which indicates that the network uses a dedicated management network. The user selection, performed on the computer display device 120, may cause a message containing the user selection to be sent to the network management system 150. The network management system 150 may receive the message containing the user input and may determine whether additional input is needed to configure the internetworking device 110.

At step 215, process 200 determines whether additional input is needed to derive a set of configuration values to configure one or more network ports on the internetworking device 110. Using the current example, upon selecting the "yes" radio button indicating that the network uses a dedicated management network, the network management system 150 may determine that additional information is needed in order to configure a port for the dedicated management network. Process 200 may proceed back to step 205 to cause display of additional prompts within the graphical user interface. If however, the network management system 150 determines that the system has the necessary network environment information, then process 200 may proceed to step 220 to derive the configuration values for configuring the internetworking device 110.

Examples of gathering additional configuration information may include, process 200 proceeding to step 205 to display additional prompts for information related to enterprise network configuration information, dedicated internet access information, device cluster information, and additional information related to IP addressing. In an embodiment, steps 205 through 215 may be repeated in order to gather needed configuration information for configuring the one or more ports on the internetworking device 110.

In an embodiment, if process 200 proceeds to step 205 to cause display of the graphical user interface with additional prompts for additional network information, process 200 may display previously received input within graphical representation 310A. For example, the network management system 150 may have previously received user input specifying a host IP address and gateway for the enterprise network. The network management system 150 may then display the host IP address and gateway for the enterprise network port within the graphical representation 310A and may display additional prompts, within text area 320A, asking the user to specify whether the internetworking device 110 is part of a cluster.

3.2 Deriving Set of Network Configuration Values

Process 200, at step 215, may determine that sufficient input for configuring the internetworking device 110 has been received to derive configuration values for the internetworking device 110. At step 220, process 200 may derive a set of network configuration values to configure a network port on the internetworking device 110. In an embodiment, the network management system 150 may derive the network configuration values for one or more network ports on the internetworking device 110 based upon user input received at step 210. For example, the network management system 150 may be configured to derive different configuration options for one or more network ports on the internetworking device 110 based upon whether the user input specified dedicated internet access, a dedicated management network, and a device cluster.

In a first example, if the user input received indicates that the network environment does not have dedicated internet access and no dedicated management network then the network management system 150 may configure a first configuration option with a single network port configured for enterprise network, management network, and internet access. In a second example, if the user input received indicates that the network environment has dedicated internet access but does not have a dedicated management network then the network management system 150 may configure a second configuration option with a first network port configured for enterprise network and management network data and a second network port configured for internet access. In a third example, if the user input received indicates that the network environment has a dedicated management network but does not have dedicated internet access then the network management system 150 may configure a third configuration option with a first network port configured for enterprise network data and internet access and a second network port configured for management network data. In a fourth example, if the user input received indicates that the network environment has a dedicated management network and dedicated internet access then the network management system 150 may configure a fourth configuration option with a first network port configured for enterprise network data, a second network port configured for internet access, and a third network port configured for management network data. Each of the above examples may also include configuring a separate port for device cluster communication based upon whether the internetworking device 110 is part of a cluster.

In an embodiment, the network management system 150 may derive configuration values including assigning IP addresses, subnet masks, gateway IPs, virtual IP addresses, proxy servers based upon the network information provided by the user input. For instance, different IP addresses, gateway IPs, subnet masks, and proxy servers may be assigned to a single network port based upon whether the single network port is to be configured for the enterprise network, the management network, internet access, and a device cluster or whether multiple network ports are to be assigned different functions.

In an embodiment, the network management system 150 may assign specified network functions to specific network ports based upon physical link requirements of each specified function. For example, network ports 312 and 314 may be capable of handling 10 GB per second of data and network ports 316 and 318 may be capable of handling 1 GB per second of data. If the user input indicates that specific network functions, such as internet access is limited to 1 GB/sec then the network management system 150 may assign either network ports 316 or 318 for dedicated internet access. By assigning network ports to network functions based upon bandwidth capability, the network management system 150 may be able to more efficiently utilize network capabilities of internetworking devices.

In an embodiment, the network management system 150 may store derived configuration values for each network port as data objects with attribute values corresponding to the configuration values. For example, if the first network port is configured for the enterprise network and internet access, then a data object corresponding to the first network port may contain attribute values specifying the associated IP address, gateway, and proxy server information. The data object may be stored within the network management system 150 such that the data objects are accessible to users who access the network management system 150 using the computer display device 120 or any other computing device. The data object may also be stored within the internetworking device 110 itself. By storing configuration information within data objects, the network management system 150 may be able to efficiently reconfigure network ports without the need to re-prompt the user for network information. For example, the network management system 150 may generate two data objects for two network ports, where the first network port is configured for the enterprise network and the second network port is configured for dedicated internet access. If the network management system 150 receives a request by the user to update the first network port to handle both the enterprise network and internet access, then the network management system 150 may copy configuration values from the second data object (second network port configured for dedicated internet access) to the first data object (first network port previously configured for the enterprise network). The network management system 150 may then reconfigure the first network port using the copied configuration values for internet access, which may include configuring a proxy server connection. Reconfiguring network ports by copying value between data objects may increase overall computing efficiency by eliminating the need to re-prompt the user for internet access related network information.

In an embodiment, if the user input received specifies that the internetworking device 110 is part of an existing cluster, then the network management system 150 may retrieve configuration information corresponding to the cluster configuration, enterprise network, management network, and internet access from one or more data objects associated with previously configured devices within the cluster. For example, if a second internetworking device, which is part of the cluster, has previously been configured then the network management system 150 may retrieve the configuration values from data objects associated the second internetworking device to derive configuration values for the internetworking device 110. By copying and deriving configuration values from the second internetworking device, the network management system 150 may increase overall computing efficiency by eliminating the need to prompt the user for network information corresponding to the enterprise network, the management network, and internet access. In another embodiment, the network management system 150 may retrieve the configuration values from data objects associated the second internetworking device directly from the second internetworking device. For example, the network management system 150 may log into the second internetworking device in order to retrieve relevant data objects.

Referring back to FIG. 2, at step 225 process 200 may display a graphical representation of the network port and the set of network configuration values corresponding to the network port. In an embodiment, the network management system 150 may cause display of the graphical user interface, including a graphical representation of a configuration option derived from the received user input. For example, if the received network information specifies that the existing network does not have dedicated internet access, no dedicated management network, and is part of a device cluster, then the network management system 150 may cause display of a first configuration option that includes a first network port configured to handle data for the enterprise network, the management network, and internet access.

Figure 3B:
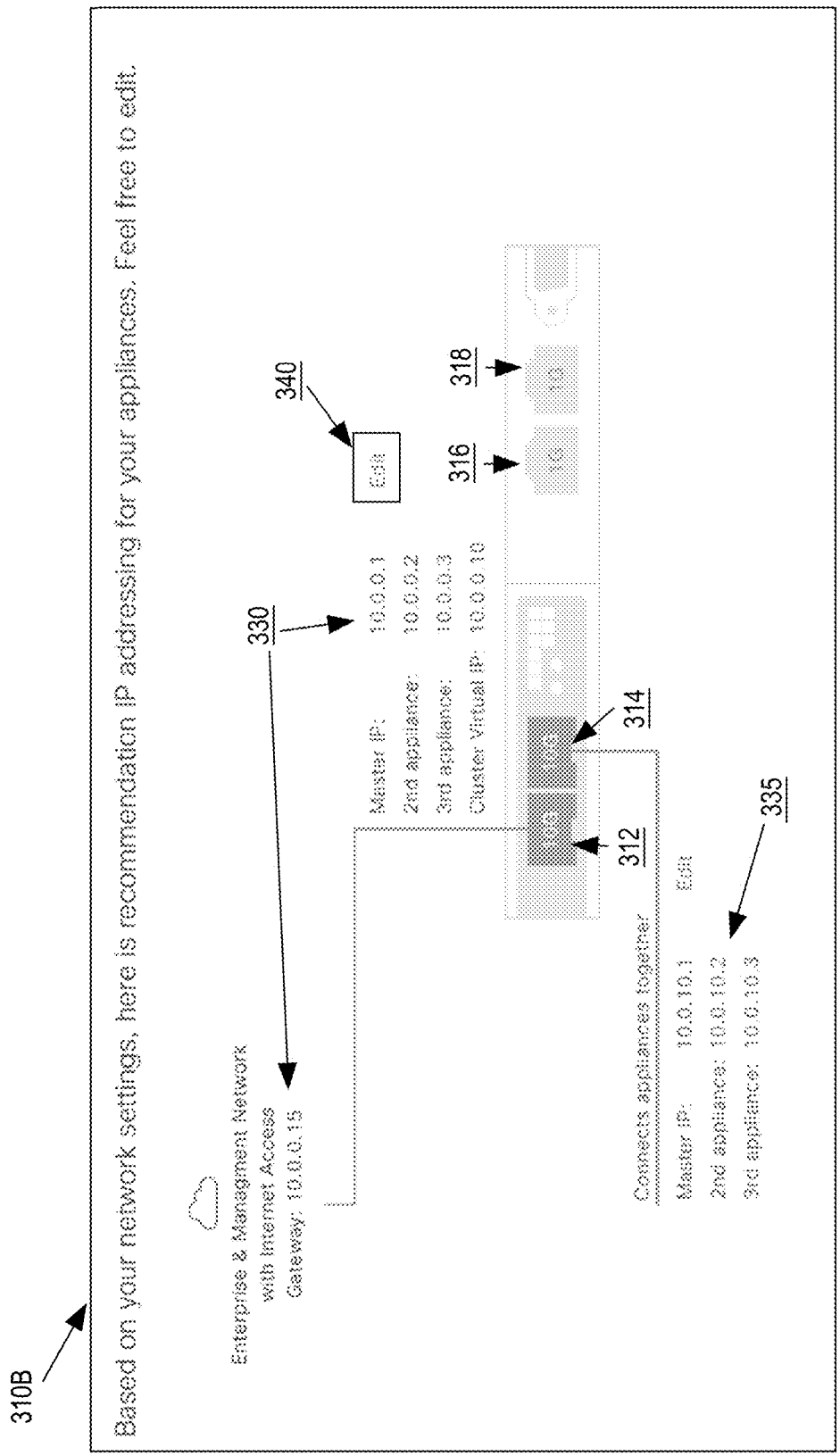
FIG. 3B depicts an example illustration of a graphical representation of a first configuration option for the internetworking device, according to various embodiments.

FIG. 3B depicts an example illustration of a graphical representation of a first configuration option for the internetworking device 110 with a first network port configured for an enterprise network, a management network, and internet access and a second network port configured for a cluster of devices. Graphical representation 310B represents a representation of the network ports on the internetworking device 110 including indicators displaying that network port 312 is configured for the enterprise network, the management network, and internet access support and network port 314 is configured for the cluster of devices. Configuration values 330 depict example configuration values, which include a gateway address, an IP address for a master device, IP addresses for additional devices, and a cluster virtual IP address based upon the user input that specified the first network port as sharing the enterprise network, management network, and internet access. Additionally, configuration values 335 may represent IP addresses assigned for the device cluster, where the internetworking device 110 is connected to the device cluster via network port 314.

Graphical representation 310B may include an edit option 340, which allows a user to edit configuration values, such as IP addresses, gateways, and any other configuration values. If a user selects the edit option 340, then the user may manually change the derived configuration values for the network ports, which would cause attributes of data objects corresponding to the network ports to be updated. A user may also select the edit option 340 to change the port assignments. For example, if the user changes the network port assigned to the device cluster from network port 314 to network port 316, then the network management system 150 may copy attribute data from the data object corresponding to network port 314 to a data object corresponding to network port 316.

Figure 3C:
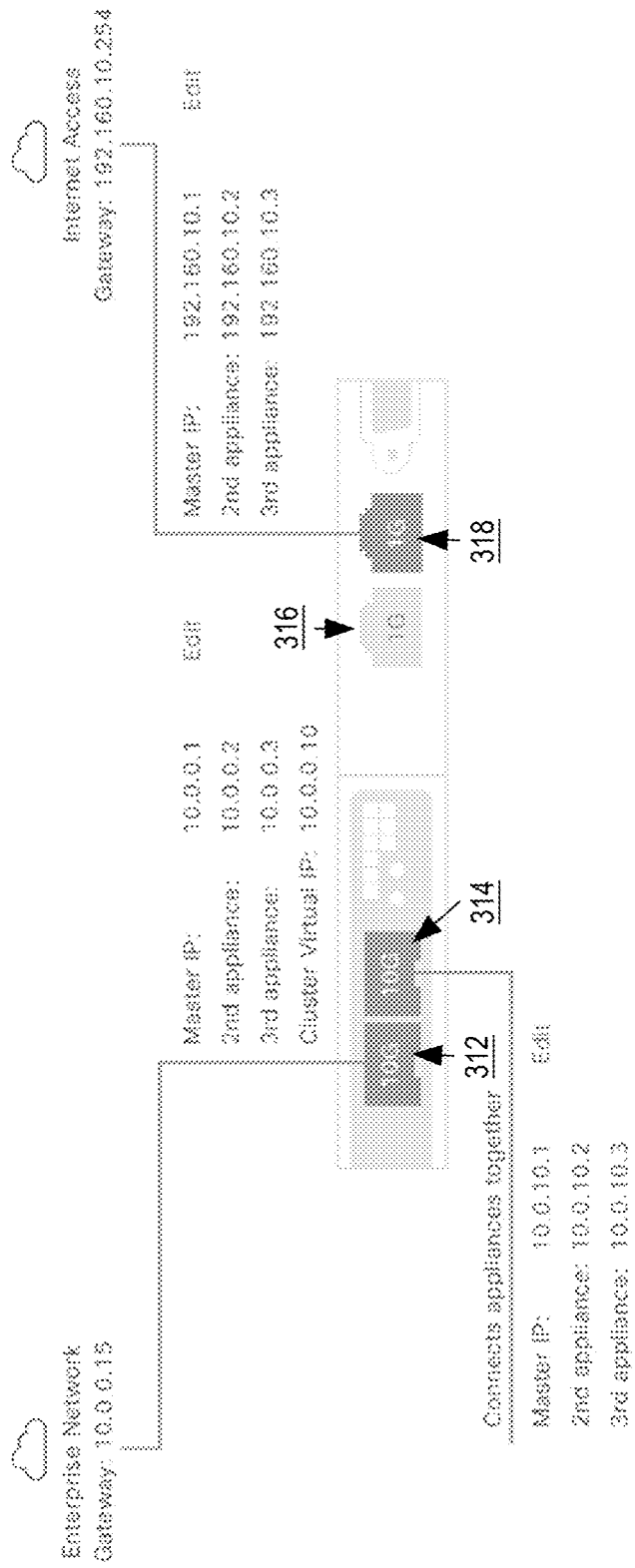
FIG. 3C depicts an example illustration of a graphical representation of a second configuration option for the internetworking device, according to various embodiments.

FIG. 3C depicts an example illustration of a graphical representation of a second configuration option for the internetworking device 110 with a first network port configured for an enterprise network and a management network, a second network port configured for internet access, and a third network port configured for a cluster of devices. Graphical representation 310C represents a representation of the network ports on the internetworking device 110 including indicators displaying that network port 312 is configured for the enterprise network and the management network. Network port 318 is configured for dedicated internet access and network port 314 is configured for the cluster of devices.

Figure 3D:
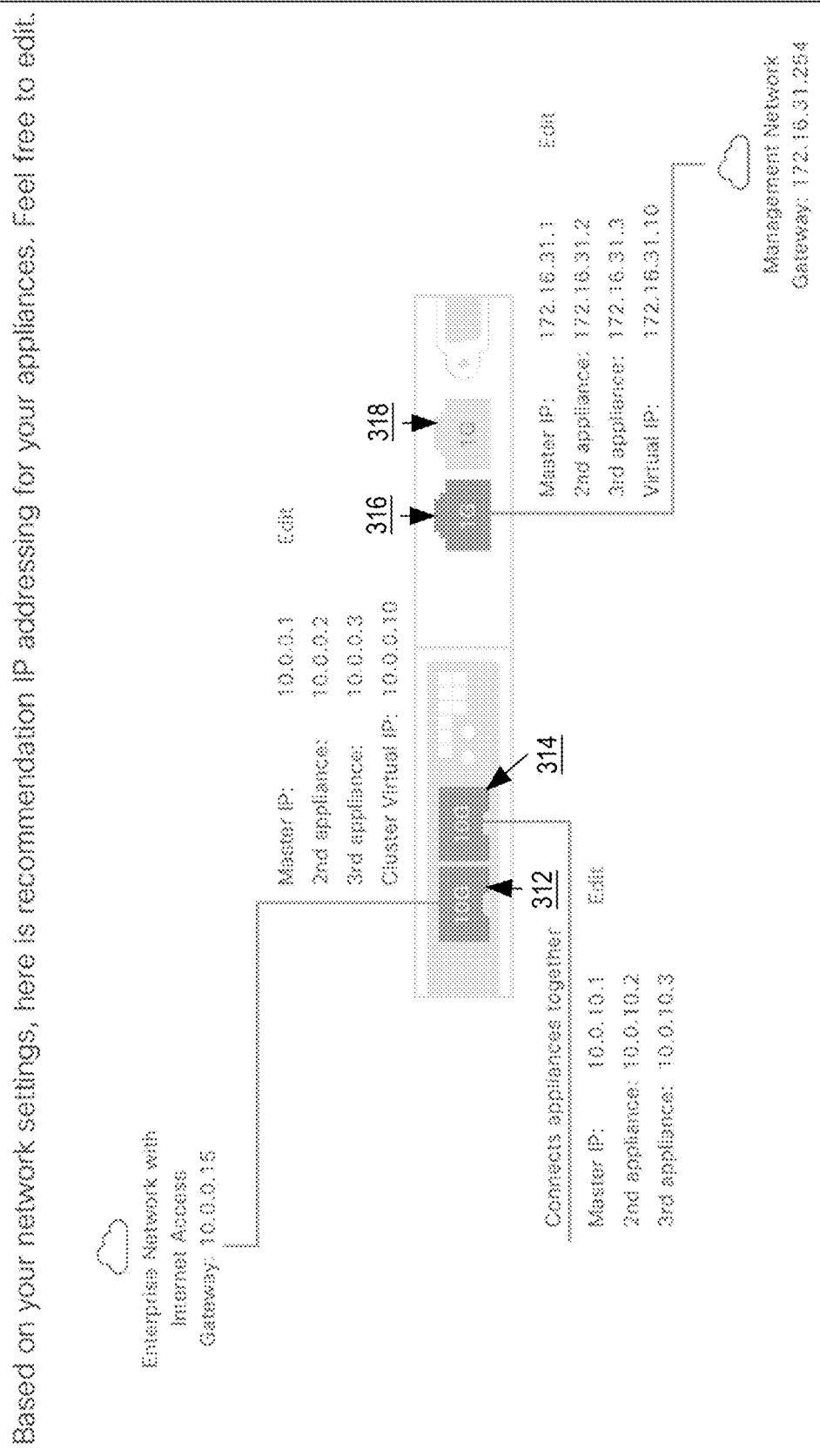
FIG. 3D depicts an example illustration of a graphical representation of a third configuration option for the internetworking device, according to various embodiments

FIG. 3D depicts an example illustration of a graphical representation of a third configuration option for the internetworking device 110 with a first network port configured for an enterprise network and internet access, a second network port configured for the management network, and a third network port configured for a cluster of devices. Graphical representation 310D represents a representation of the network ports on the internetworking device 110 including indicators displaying that network port 312 is configured for the enterprise network and internet access. Network port 316 is configured for the management network and network port 314 is configured for the cluster of devices.

Figure 3E:
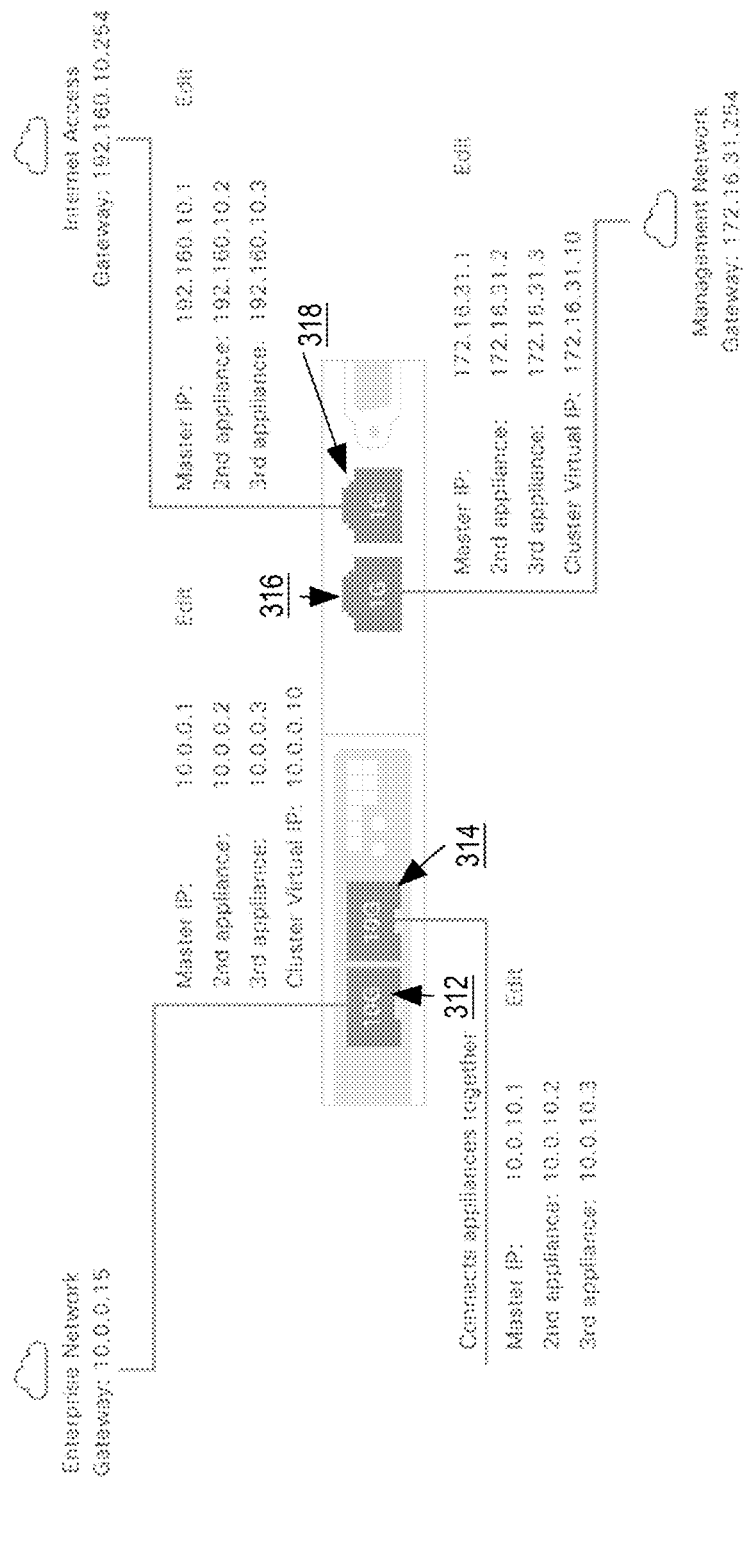
FIG. 3E depicts an example illustration of a graphical representation of a fourth configuration option for the internetworking device, according to various embodiments

FIG. 3E depicts an example illustration of a graphical representation of a fourth configuration option for the internetworking device 110 with a first network port configured for an enterprise network, a second network port configured for dedicated management network, a third network port configured for dedicated internet access, and a fourth network port configured for a cluster of devices. Graphical representation 310E represents a representation of the network ports on the internetworking device 110 including indicators displaying that network port 312 is configured for the enterprise network, network port 316 is configured for dedicated management network, network port 318 is configured for dedicated internet access, and network port 314 is configured for the cluster of devices.

3.3 Configuring an Internetworking Device

Referring to FIG. 2, at step 230 process 200 configures a network port of the internetworking device 110 using the set of network configuration values. In an embodiment, in response to confirming the derived set of network configuration values, the network management system 150 may transmit configuration data to the internetworking device to cause configuration of one or more network ports on the internetworking device 110. For example, upon displaying on the computer display device 120, the graphical representation of the selected configuration option for the internetworking device 110, the network management system 150 may receive confirmation from the user that the network configuration values are accurate. The network management system 150 may then transmit the network configuration values to the internetworking device 110 in order to configure the one or more network ports. Transmission of the network configuration values may require that at least one network port of the internetworking device 110 is connected to the network management system 150 via the network environment 130.

Upon receiving the network configuration values at the internetworking device 110, the internetworking device 110 may configure the one or more network ports. In an embodiment, the network management system 150 may cause display of physical installation instructions that describe to the user how to physically connect the remaining network ports on internetworking device 110 to the network environment 130. For example, the physical installation instructions may describe that the cable for internet access needs to be connected to network port 318.

In an embodiment, the network management system 150 may display connectivity status feedback to the computer display device 120 during the physical installation process. For example, the network management system 150 may cause display of physical instructions to connect the internet access cable to the corresponding network port. After the user has connected the internet access cable, the user may, via the computer display device 120, send a test request to the network management system 150 to test the internet access connection. The network management system 150 may then perform one or more connectivity tests to ensure that the correct cable has been connected to the correct network port on the internetworking device 110. The one or more connectivity tests may include pinging the IP address assigned to the particular network port to ensure a successful connection. The network management system 150 may present the status of the connectivity test within the GUI displayed on the computer display device 120. The network management system 150 may sequentially test each network port configured for connectivity. If the connection status of a configured network port is inactive or incorrect, then the network management system 150 may provide options to the user to either retest the connection or to bypass testing the network port.

Figure 3F:
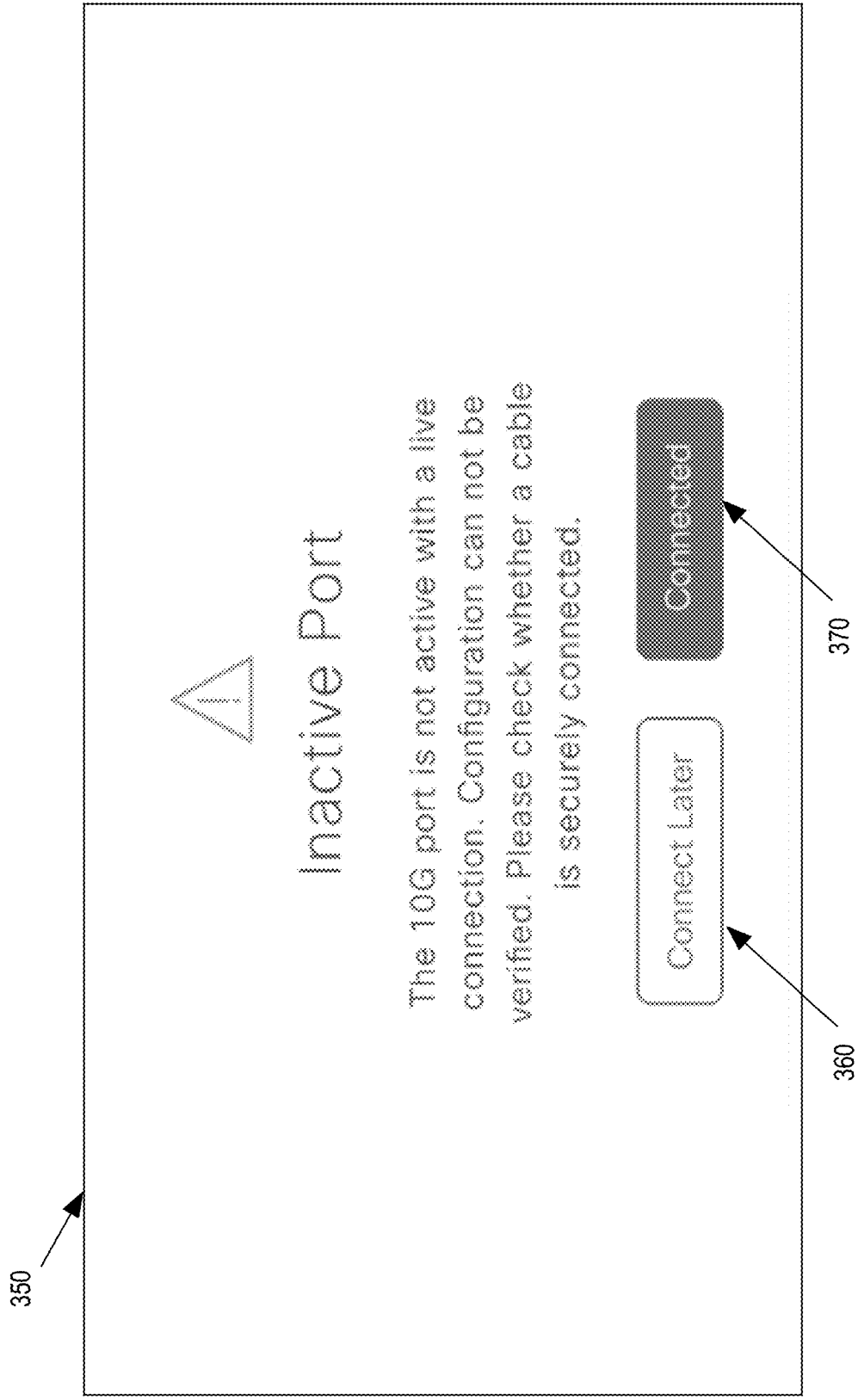
FIG. 3F depicts an example illustration of the graphical user interface with a connection status window indicating the connection status of a given network port of the internetworking device, according to various embodiments

FIG. 3F depicts an example illustration of the graphical user interface with a connection status window indicating the connection status of a given network port of the internetworking device 110. Window 350 depicts a connection status window that indicates that the network port being tested is inactive. Window 350 may be configured to provide options to retest the connection on the network port or to bypass the connection status. Button 360 depicts a "Connect Later" button that allows the user to bypass testing the current network port. Button 370 depicts a "Connected" button that informs the network management system 150 to retest connectivity of the network port.

4.0 Implementation Mechanisms-Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
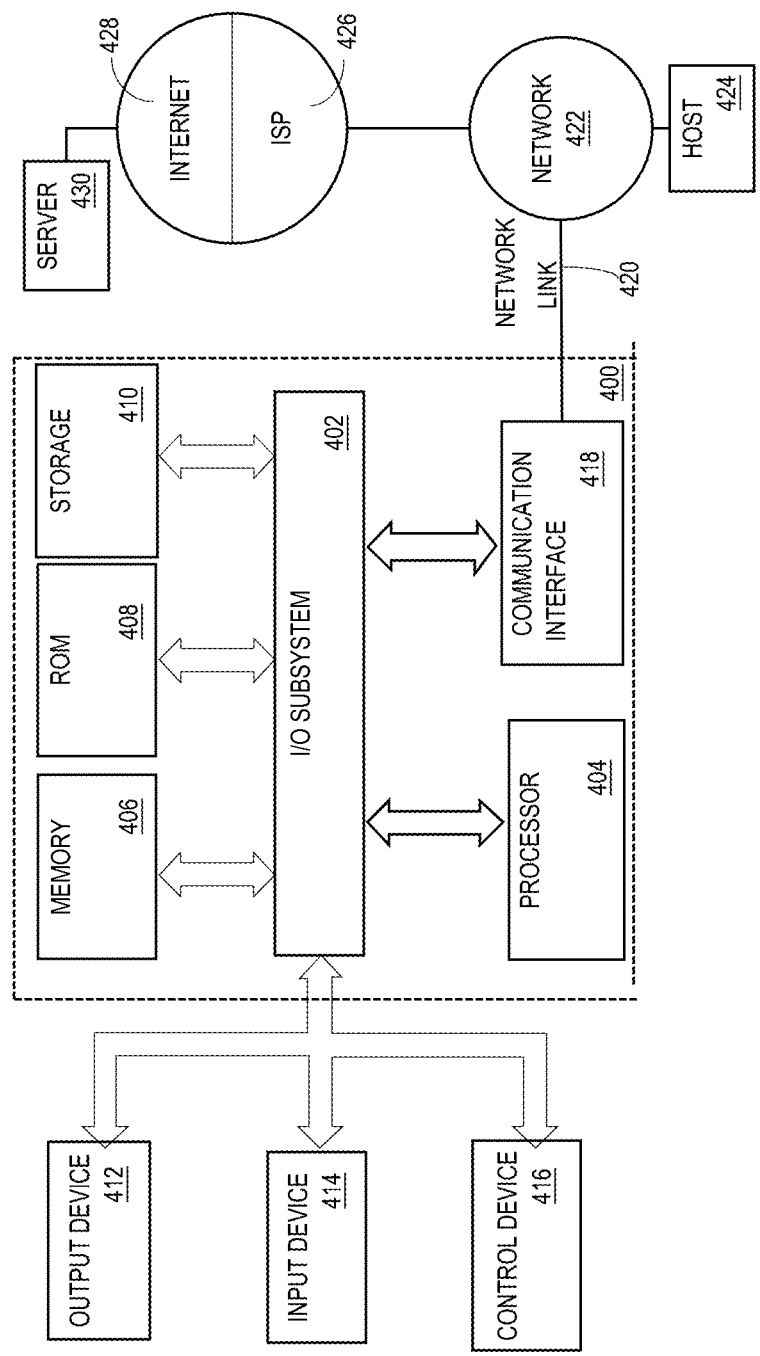
FIG. 4 illustrates a computer system upon which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5.0 Benefits, Improvements, Extensions and Alternatives

Embodiments provide the technical benefits of reducing network bandwidth and computing resources associated with generating and transmitting prompt data and receiving input data related to configuration of internetworking devices. By automatically deriving internetworking device configuration values from input data that specifies the current network environment, computing resources wasted on excess configuration prompts may be eliminated. Additionally, the configuration values for interfaces on internetworking devices may be stored within data objects. When configuration changes to the internetworking device is requested, stored configuration values from data objects may be accessed to reconfigure the internetworking device without the need to generate and transmit additional configuration prompts. Thereby further reducing computing resources used for additional configuration prompts.

Based on the foregoing, it will be apparent that the disclosure as a whole is directed to improvements in in internetworking technology by providing new and more efficient methods of configuring appliances, routers, switches and other internetworking devices.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

generating a graphical user interface comprising a graphical representation of network ports of an internetworking device and a text area prompting input of current network environment information;

receiving a first input specifying the current network environment information for a network to which the internetworking device is to be connected;

determining that the first input specifying the current network environment information specifies a dedicated internet access and a dedicated management network;

deriving, in response to determining that the first input specifying the current network environment information does not specify the dedicated internet access and the dedicated management network, a set of network configuration values to configure a first network port on the internetworking device for each of an enterprise network connection, a management network, and an internet access, the set of network configuration values being based on the first input specifying the current network environment information, wherein deriving the set of network configuration values to configure the first network port on the internetworking device comprises:

determining physical link requirements for each of the enterprise network connection, the management network, and the internet access from the first input specifying the current network environment information, selecting the first network port from a plurality of network ports on the internetworking device that satisfy the physical link requirements, and deriving the set of network configuration values to configure the first network port for each of the enterprise network connection, the management network, and the internet access based on the first input specifying the current network environment information;

displaying, in the graphical user interface, a graphical representation of the first network port and the set of network configuration values corresponding to the first network port on the internetworking device; and in response to input confirming the set of network configuration values for the first network port, transmitting configuration data to the internetworking device resulting in configuring the first network port of the internetworking device using the set of network configuration values.

2. The method of claim 1, wherein the text area comprises an option to specify that a current network environment has the dedicated management network, and wherein the method further comprising:
    receiving a second input specifying that the current network environment has the dedicated management network;
    displaying on the text area a prompt to input a dynamic name server, a default gateway IP address, a subnet mask, and a virtual local area network identifier for the dedicated management network;
    receiving a third input specifying at least one of the dynamic name server, the default gateway IP address, the subnet mask, and the virtual local area network identifier for the dedicated management network; and
    deriving the set of network configuration values to configure the first network port on the internetworking device for the enterprise network connection and a second network port on the internetworking device for the dedicated management network, the set of network configuration values based, at least in part, on the dynamic name server, the default gateway IP address, the subnet mask, and the virtual local area network identifier for the dedicated management network.

3. The method of claim 1, wherein the text area comprises an option to specify that a current network environment has the dedicated internet access, and wherein the method further comprising:
    receiving a second input specifying that the current network environment has the dedicated internet access;
    displaying on the text area a prompt to input proxy server information for the dedicated internet access;
    receiving a third input specifying the proxy server information for the dedicated internet access; and
    deriving the set of network configuration values to configure the first network port on the internetworking device for the enterprise network connection and a second network port on the internetworking device for the dedicated internet access, the set of network configuration values based, at least in part, on the proxy server information for the dedicated internet access.

4. The method of claim 1, wherein the text area comprises an option to specify that the internetworking device is part of a cluster of multiple internetworking devices, and wherein the method further comprising:
    receiving a second input specifying that the internetworking device is to be set up as part of the cluster of multiple internetworking devices;
    displaying on the text area a prompt to input credentials for the cluster of multiple internetworking devices;
    receiving a third input specifying the credentials for the cluster of multiple internetworking devices; and
    deriving the set of network configuration values to configure the first network port on the internetworking device for the enterprise network connection and a second network port on the internetworking device for connecting to the cluster of multiple internetworking devices, the set of network configuration values based, at least in part, on the credentials.

5. The method of claim 4, wherein deriving the set of network configuration values to configure the first network port on the internetworking device for the enterprise network connection and the second network port on the internetworking device for connecting to the cluster of multiple internetworking devices comprises:
    retrieving a second set of network configuration values associated with a second internetworking device of the cluster of multiple internetworking devices using the credentials for the cluster of multiple internetworking devices; and
    deriving the set of network configuration values to configure the first network port and the second network port using the second set of network configuration values.

6. The method of claim 1, further comprising:
    validating that a connection of the first network port of the internetworking device to a current network environment is successful by testing connectivity between the internetworking device and the current network environment via the first network port;
    determining that the connection of the first network port of the internetworking device to the current network environment is unsuccessful; and
    displaying in the graphical user interface an alert indicating an unsuccessful connection between the first network port of the internetworking device to the current network environment and installation instructions describing how to physically connect the internetworking device using the first network port to the current network environment.

7. The method of claim 1, wherein the set of network configuration values are stored, within the internetworking device, as a data object that is associated with the first network port on the internetworking device, and wherein the method further comprising:
    upon displaying the graphical representation of the first network port and the set of network configuration values corresponding to the first network port, receiving a second input specifying reconfiguration of the set of network configuration values associated with the first network port to a second network port on the internetworking device;
    disassociating the set of network configuration values from the first network port and associating the set of network configuration values to the second network port on the internetworking device; and
    displaying, within the graphical user interface, a graphical representation of the second network port and the set of network configuration values corresponding to the second network port on the internetworking device.

8. The method of claim 1, further comprising:
    the internetworking device, deriving another set of network configuration values to configure a second network port on the internetworking device, wherein the another set of network configuration values are based on the input specifying the current network environment information;
    the internetworking device, displaying, within the graphical user interface, a graphical representation of the second network port and the another set of network configuration values corresponding to the first network port on the internetworking device; and
    the internetworking device, upon receiving confirmation that the another set of network configuration values are correct for the first network port, configuring the second network port of the internetworking device using the another set of network configuration values.

9. A computer system comprising:
a memory device; and
a processor connected to the memory device, wherein the processor is operative to:
  generate a graphical user interface comprising a graphical representation of network ports of an internetworking device and a text area prompting input of current network environment information;
  receive a first input specifying network environment information for a network to which the internetworking device is to be connected;
  determine that the first input specifying the current network environment information specifies a dedicated internet access and a dedicated management network;
  derive, in response to determining that the first input specifying the current network environment information does not specify the dedicated internet access and the dedicated management network, a set of network configuration values to configure a first network port on the internetworking device for each of an enterprise network connection, a management network, and an internet access, the set of network configuration values being based on the first input specifying the current network environment information, wherein the processor being operative to derive the set of network configuration values to configure the first network port on the internetworking device comprises the processor being operative to:
    determine physical link requirements for each of the enterprise network, the management network connection, and the internet access from the first input specifying the current network environment information,
    select the first network port from a plurality of network ports on the internetworking device that satisfy the physical link requirements, and
    derive the set of network configuration values to configure the first network port for each of the enterprise network connection, the management network, and the internet access based on the input specifying the current network environment information;
  display, in the graphical user interface, a graphical representation of the first network port and the set of network configuration values corresponding to the first network port on the internetworking device; and
  in response to input confirming the set of network configuration values for the first network port, transmit configuration data to the internetworking device resulting in configuring the first network port of the internetworking device using the set of network configuration values.

10. The computer system of claim 9, wherein the text area comprises an option to specify whether the current network environment has the dedicated management network, and wherein the processor is further operative to:
  receive a second input specifying that the current network environment has the dedicated management network;
  display on the graphical user interface comprising the text area, the text area comprising a prompt to input a dynamic name server, a default gateway IP address, a subnet mask, and a virtual local area network identifier for the dedicated management network;
  receive a third input specifying at least one of the dynamic name server, the default gateway IP address, the subnet mask, and the virtual local area network identifier for the dedicated management network; and
  derive the set of network configuration values to configure the first network port on the internetworking device for the enterprise network connection and a second network port on the internetworking device for the dedicated management network, the set of network configuration values based, at least in part, on the dynamic name server, the default gateway IP address, the subnet mask, and the virtual local area network identifier for the dedicated management network.

11. The computer system of claim 9, wherein the text area comprises an option to specify whether the current network environment has the dedicated internet access, and wherein the processor is further operative to:
  receive a second input specifying that the current network environment has the dedicated internet access;
  display on the computer display device, the graphical user interface comprising the text area, the text area comprising a prompt to input proxy server information for the dedicated internet access;
  receive a second input specifying the proxy server information for the dedicated internet access; and
  derive the set of network configuration values to configure the first network port on the internetworking device for the enterprise network connection and a second network port on the internetworking device for the dedicated internet access, the set of network configuration values based, at least in part, on the proxy server information for the dedicated internet access.

12. The computer system of claim 9, wherein the text area comprises an option to specify whether the internetworking device is part of a cluster of multiple internetworking devices, and wherein the processor being further operative to:
  receive a second input specifying that the internetworking device is to be set up as part of the cluster of multiple internetworking devices;
  display, on the graphical user interface comprising the text area, the text area comprising a prompt to input credentials for the cluster of multiple internetworking devices;
  receive a third input specifying the credentials for the cluster of multiple internetworking devices; and
  derive the set of network configuration values to configure the first network port on the internetworking device for the enterprise network connection and a second network port on the internetworking device for connecting to the cluster of multiple internetworking devices, the set of network configuration values based, at least in part, on the credentials.

13. The computer system of claim 12, wherein the processor being operative to derive the set of network configuration values to configure the first network port on the internetworking device for the enterprise network connection and the second network port on the internetworking device for connecting to the cluster of multiple internetworking devices comprises the processor being operative to:
  retrieve a second set of network configuration values associated with a second internetworking device of the cluster of multiple internetworking devices using the credentials for the cluster of multiple internetworking devices; and
  derive the set of network configuration values to configure the first network port and the second network port using the second set of network configuration values.

14. The computer system of claim 9, wherein the processor is further operative to:
  validate that a connection of the network port of the internetworking device to the current network environment is successful by testing connectivity between the internetworking device and the current network environment via the first network port;
  determine that the connection of the first network port of the internetworking device to the current network environment is unsuccessful; and
  display, in the graphical user interface, an alert indicating an unsuccessful connection between the first network port of the internetworking device to the current network environment and installation instructions describing how to physically connect the internetworking device using the first network port to the current network environment.

15. The computer system of claim 9, wherein the set of network configuration values being stored, within the internetworking device, as a data object that is associated with the network port on the internetworking device, and wherein the processor is further operative to:
  upon displaying the graphical representation of the network port and the set of network configuration values corresponding to the network port, receive a second input specifying reconfiguration of the set of network configuration values associated with the first network port to a second network port on the internetworking device;
  disassociate the set of network configuration values from the first network port and associating the set of network configuration values to the second network port on the internetworking device; and
  display, within the graphical user interface, a graphical representation of the second network port and the set of network configuration values corresponding to the second network port on the internetworking device.

16. The computer system of claim 9, wherein the processor is further operative to:
  cause the internetworking device to derive a second set of network configuration values to configure a second network port on the internetworking device, wherein the second set of network configuration values are based on the input specifying the current network environment information;
  cause the internetworking device display, within the graphical user interface, a graphical representation of the second network port and the second set of network configuration values corresponding to the network port on the internetworking device; and
  cause the internetworking device, upon receiving input confirming the second set of network configuration values for the network port, to configure the second network port of the internetworking device using the second set of network configuration values.

17. A non-transitory computer-readable storage medium comprising instructions which, when executed, perform a method comprising:
  generating a graphical user interface comprising a graphical representation of network ports of an internetworking device and a text area prompting input of current network environment information;
  receiving a first input specifying network environment information for a network to which the internetworking device is to be connected;
  determining that the first input specifying the current network environment information specifies a dedicated internet access and a dedicated management network;
  deriving, in response to determining that the first input specifying the current network environment information does not specify the dedicated internet access and the dedicated management network, a set of network configuration values to configure a first network port on the internetworking device for each of an enterprise network connection, a management network, and an internet access, the set of network configuration values being based on the first input specifying the current network environment information, wherein deriving the set of network configuration values to configure the first network port on the internetworking device comprises:
    determining physical link requirements for each of the enterprise network connection, the management network, and the internet access from the first input specifying the current network environment information,
    selecting the first network port from a plurality of network ports on the internetworking device that satisfy the physical link requirements, and
    deriving the set of network configuration values to configure the first network port for each of the enterprise network connection, the management network, and the internet access based on the input specifying the current network environment information;
  displaying, in the graphical user interface, a graphical representation of the first network port and the set of network configuration values corresponding to the network port on the internetworking device; and
  in response to input confirming the set of network configuration values for the first network port, transmitting configuration data to the internetworking device resulting in configuring the first network port of the internetworking device using the set of network configuration values.

18. The non-transitory computer-readable storage medium of claim 17, wherein the text area comprises an option to specify whether the current network environment has the dedicated management network, and wherein the method further comprising:
  receiving a second input specifying that the current network environment has the dedicated management network;
  displaying on the graphical user interface comprising the text area, the text area comprising a prompt to input a dynamic name server, a default gateway IP address, a subnet mask, and a virtual local area network identifier for the dedicated management network;
  receiving a third input specifying at least one of the dynamic name server, the default gateway IP address, the subnet mask, and the virtual local area network identifier for the dedicated management network; and
  deriving the set of network configuration values to configure the first network port on the internetworking device for the enterprise network connection and a second network port on the internetworking device for the dedicated management network, the set of network configuration values based, at least in part, on the dynamic name server, the default gateway IP address, the subnet mask, and the virtual local area network identifier for the dedicated management network.

19. The non-transitory computer-readable storage medium of claim 17, wherein the text area comprises an option to specify that the current network environment has the dedicated internet access, and wherein the method further comprising:

receiving a second input specifying that the current network environment has the dedicated internet access;

displaying on the graphical user interface comprising the text area, the text area comprising a prompt to input proxy server information for the dedicated internet access;

receiving a third input specifying the proxy server information for the dedicated internet access; and deriving the set of network configuration values to configure the first network port on the internetworking device for the enterprise network connection and a second network port on the internetworking device for the dedicated internet access, the set of network configuration values based, at least in part, on the proxy server information for the dedicated internet access.

20. The non-transitory computer-readable storage medium of claim 17, wherein the text area comprises an option to specify that the internetworking device is part of a cluster of multiple internetworking devices, and wherein the method further comprising:

receiving a second input specifying that the internetworking device is to be set up as part of the cluster of multiple internetworking devices;

displaying on the graphical user interface comprising the text area, the text area comprising a prompt to input credentials for the cluster of multiple internetworking devices;

receiving a third input specifying the credentials for the cluster of multiple internetworking devices; and deriving the set of network configuration values to configure the first network port on the internetworking device for the enterprise network connection and a second network port on the internetworking device for connecting to the cluster of multiple internetworking devices, the set of network configuration values based, at least in part, on the credentials.

* * * * *